United States Patent
Liebrecht et al.

(10) Patent No.: US 6,417,490 B1
(45) Date of Patent: Jul. 9, 2002

(54) METHOD AND DEVICE FOR THERMALLY SUPPORTING MECHANICAL JOINTS

(75) Inventors: Fritz Liebrecht, Dresden; Georg Donhauser, Amberg; Reinhard Mauermann, Dresden; Hartmut Carstensen, Berlin, all of (DE)

(73) Assignees: Technische Universitaet Dresden, Dresden; Kerb-Konus-Vertriebs-GmbH, Amberg; Daimler Chrysler AG, Ulm, all of (DE)

(*) Notice: Subject to any disclaimer, the term of this patent is extended or adjusted under 35 U.S.C. 154(b) by 0 days.

(21) Appl. No.: 09/554,641
(22) PCT Filed: Nov. 17, 1998
(86) PCT No.: PCT/DE98/03393
§ 371 (c)(1), (2), (4) Date: Sep. 6, 2000
(87) PCT Pub. No.: WO99/25510
PCT Pub. Date: May 27, 1999

(30) Foreign Application Priority Data

Nov. 17, 1997 (DE) .......................... 197 50 831
Nov. 17, 1998 (DE) .......................... 198 52 809

(51) Int. Cl.⁷ ................................ C21D 9/62
(52) U.S. Cl. ................ 219/157; 219/150 V; 219/50
(58) Field of Search ................ 219/157, 50, 150 V, 219/78.02, 162; 227/51

(56) References Cited

U.S. PATENT DOCUMENTS

| | | | |
|---|---|---|---|
| 1,721,263 A | * | 7/1929 | Tapman |
| 2,781,442 A | * | 2/1957 | Flessner et al. |
| 3,854,030 A | * | 12/1974 | Roye |
| 3,878,356 A | | 4/1975 | Roye |
| 4,119,827 A | * | 10/1978 | Lenox |
| 4,296,303 A | * | 10/1981 | Tsuchida et al. |
| 4,858,289 A | | 8/1989 | Speller, Sr. |
| 5,025,128 A | * | 6/1991 | Derbyshire |
| 5,678,970 A | | 10/1997 | Caulk |
| 5,739,498 A | * | 4/1998 | Sunamoto et al. |
| 5,828,028 A | * | 10/1998 | Cecil |

FOREIGN PATENT DOCUMENTS

| | | |
|---|---|---|
| DE | 39 32 294 C1 | 11/1990 |
| DE | 196 30 488 C2 | 1/1998 |
| WO | WO 93/10925 | 6/1993 |

\* cited by examiner

*Primary Examiner*—Tom Dunn
*Assistant Examiner*—Colleen P. Cooke
(74) *Attorney, Agent, or Firm*—Jordan and Hamburg LLP

(57) ABSTRACT

The invention relates to a method and device for thermally supporting mechanical joints by means of punched rivets with a semi-hollow rivet or a solid rivet or by pounding. The method is characterized in that a local and time limited heating of the joint parts (1a, 1b) occurs by means of electric resistance heating in the future forming zone, whereby the heating is carried out by means of a hold-down device (5) and a matrix (4) or by elements (10/11, 12/13) arranged next to or elements (14, 15) arranged in front of said hold-down device and matrix. The heating is initiated at the start of or immediately before the joining process and is completed before the forming begins.

16 Claims, 4 Drawing Sheets

Station 1    Station 2

METHOD AND DEVICE FOR THERMALLY SUPPORTING MECHANICAL JOINTS

Figure 1E:
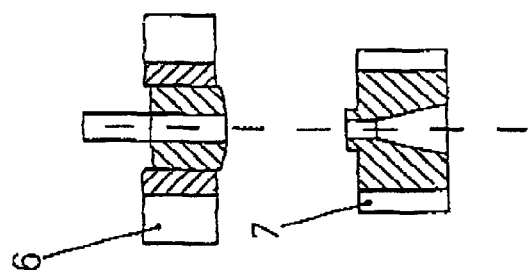

The invention relates to a method for thermally supported mechanical joining. The invention also relates to a device for carrying out the method.

For joining sheets, for example, resistance spot welding is known. In this method the sheets are melted locally and joined in the melted zone. Due to the structure changes occurring in the melting zone, the sheets withstand smaller mechanical loads in this zone.

For mechanical joining, methods are known like
clinch joining,
self-piercing riveting with semi-hollow rivets,
self-piercing riveting with solid rivets.

The mechanical joint is made at room temperature. A disadvantage of these methods is that the mechanical joining process leads to, in some cases, extreme, strain hardening in the joint zone. The appropriate devices as well as the tooling must be dimensioned to withstand high loads. Joining auxiliary parts such as semi-hollow rivets or solid rivets are deformed, even destroyed. Therefore, high-strength sheets can be employed to only a limited extent.

It is the objective of this invention to describe a method as well as a device that make possible the use of high-strength materials, also with an extremely high strain hardening degree as austenitic high-quality steels, for self-piercing riveting with semi-hollow rivet or solid rivet, or clinch joining, respectively.

According to the invention, the problem is solved by a method with the features mentioned in claim 1. Further, the problem is solved by a device with the features mentioned in claim 7. The subclaims present other useful developments of the invention.

The essential aspect of the invention is that a local and time limited heating of the parts to be jointed by electrical resistance heating takes place in the future deformation zone, whereby the heating is performed via the blank holder and die or elements arranged directly adjacent to said blank holder and die or directly preceding them, and the heating is initiated at the beginning or immediately before and is completed before the beginning of the forming in the deformation zone.

Advantageously, in a first version of the method, the heating takes place directly between a blank holder and a die, whereby the heating is initiated at the beginning of the working stroke For this, the blank holder is provided with an inclined bearing surface, and the die with a ring.

In an advantageous second version of the method, the heating occurs between an upper ring consisting of one or several contact shoes and a lower ring consisting of one or several contact shoes, which are arranged surrounding the blank holder and die each, whereby the heating is initiated at the beginning of the working stroke.

In an advantageous third version of the method, the heating occurs between a first electrode and a second electrode, which are assigned to a first station and the forming is carried out in a subsequent second station, whereby the heating is initiated immediately before the beginning of the forming.

The heating does not primarily affect the tooling or the joining auxiliary parts, but the heating covers that zone in the parts to be joined in tat the highest degree of deformation occurs. Heating is completed before the forming process begins, and starts either after the beginning of the working stroke or immediately before the working stroke of a station preceding the forming. Hence, heating can be easily controlled and the energy input limited to a minimum. After forming cooling of the joint immediately starts. This is achieved by inputting a minimum amount of heat and exactly timing the blank holder stroke/heating/forming.

For the realization of the method the blank holder and the die or elements arranged directly adjacent to said blank holder and die or directly preceding them are designed as poles for electrical resistance heating, whereby the blank holder, die and contact shoe are provided with appropriate bearing surfaces so that current lines extend through the parts to be joined in a locally restricted extent which limit the range of heating.

In a first device the blank holder is provided with an inclined surface and the die with a ring-shaped elevation.

In a second device an upper ring of one or several contact shoes that is arranged surrounding a blank holder, and a lower ring of one or several contact shoes that is arranged surrounding a die, are provided, whereby the bearing surfaces of the contact shoes are located very close to the blank holder and the die thus limiting the range of heating.

In a third device electrodes for heating of the parts to be joined are provided in a station that is arranged preceding the forming station.

The advantage of the invention is that the known self-piercing riveting with semi-hollow rivets or solid rivets, or the clinch joining can also be employed with high-strength materials, also with an extreme degree of strain hardening, whereby no negative effect on the quality of the joint due to overstressing of the joining auxiliary parts or basic material, respectively, occurs during forming. A radial prestress at the joining point due to cooling at the joint increases the strength of the joint.

Figure 2:
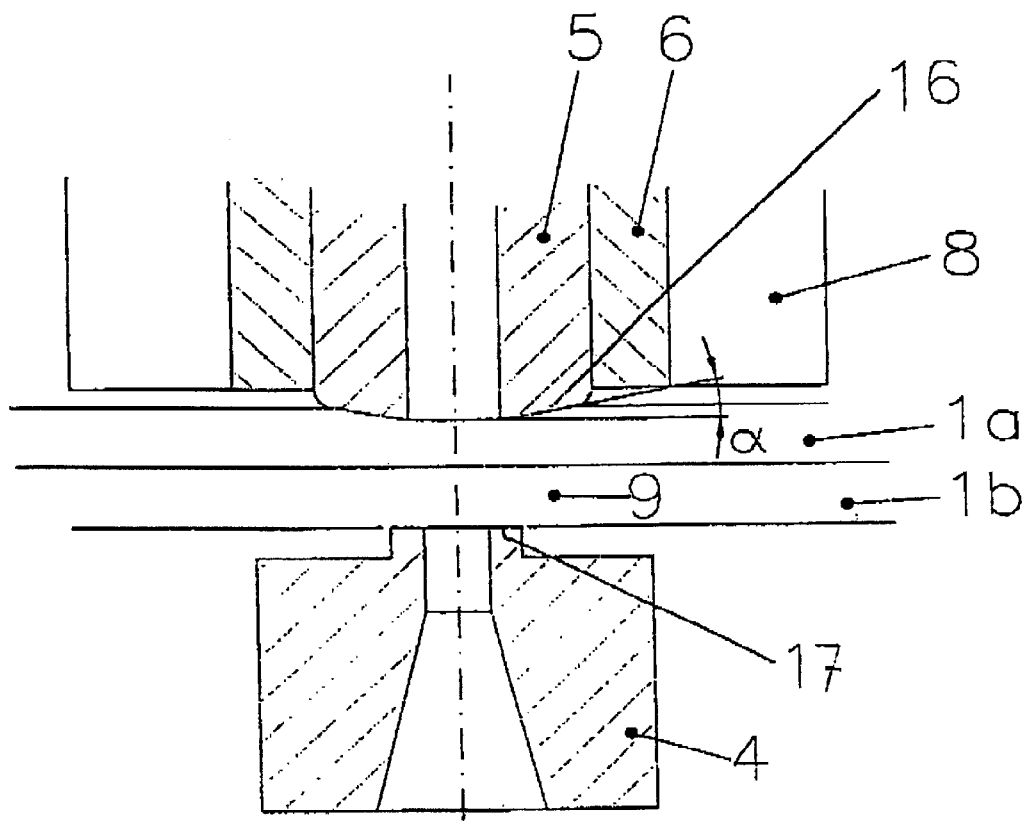
Figure 3:
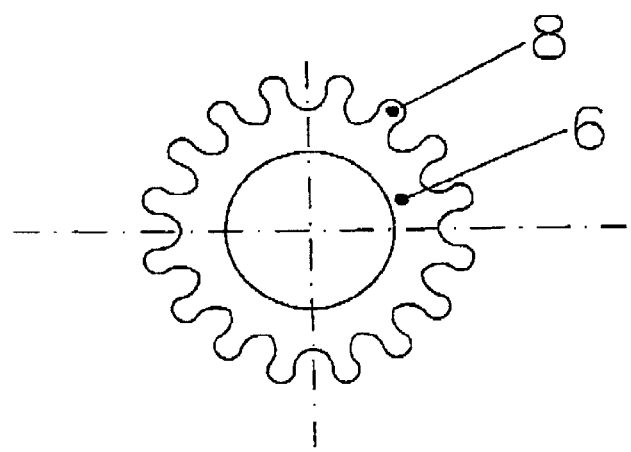
Figure 4:
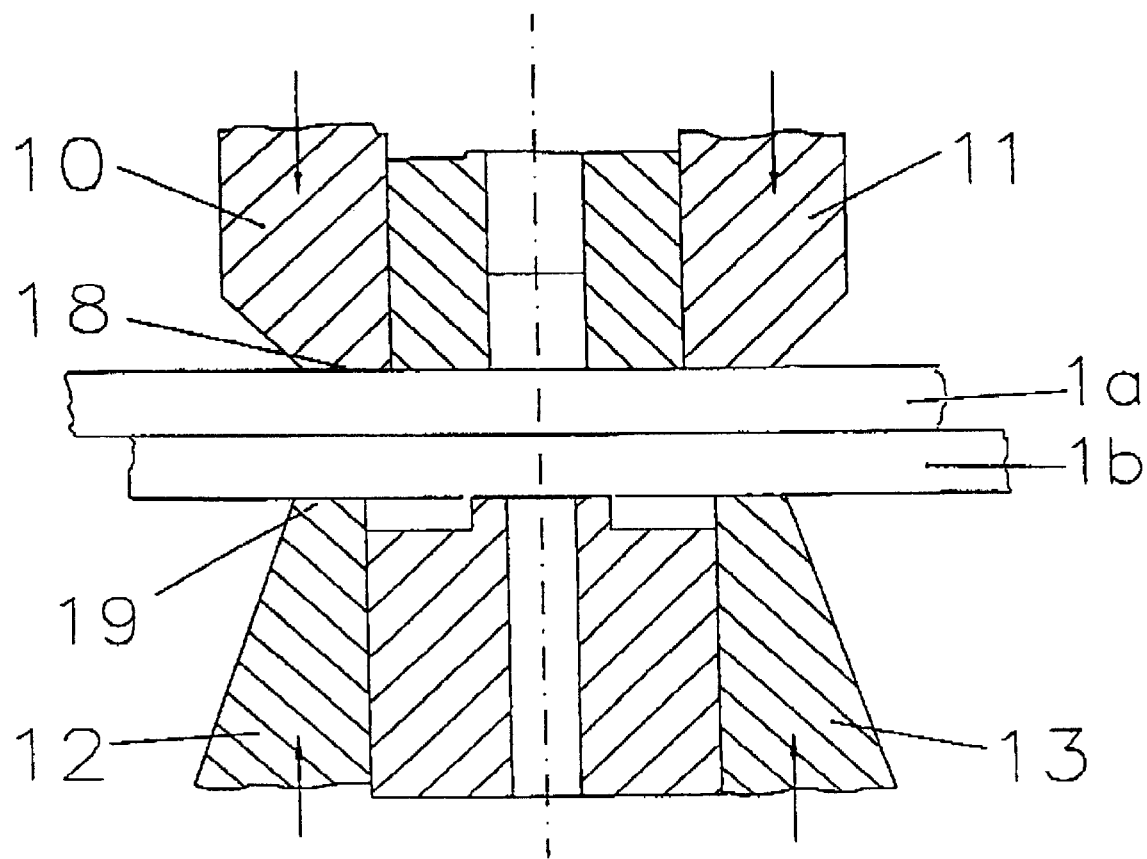
Figure 5:
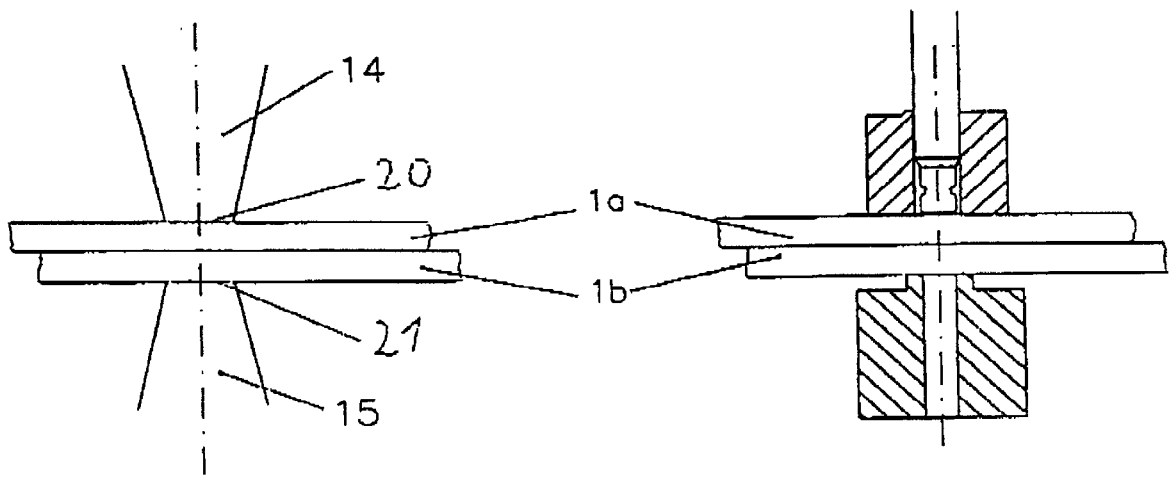

In the following, the invention is further explained by example of embodiment of the method and the device. In the drawings it is shown by FIGS. 1a–1e different phases of a mechanical joining process taking the self-piercing riveting with solid rivet as an example;

FIG. 2 schematically, a device according to the invention showing the parts to be joined without joining auxiliary part;

FIG. 3 a cooling body being part of FIG. 2;

FIG. 4 a device according to the invention with a contact shoe surrounding the blank holder and the die each;

FIG. 5 a device according to the invention with electrodes for heating in a first station and the joining device in a second station.

Figure 1D:
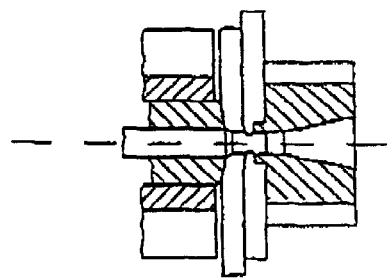
Figure 1C:
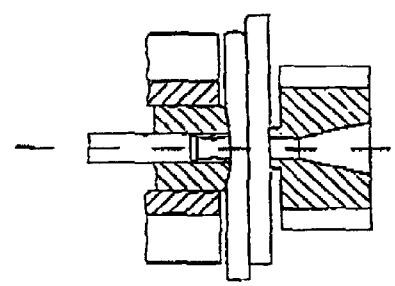
Figure 1B:
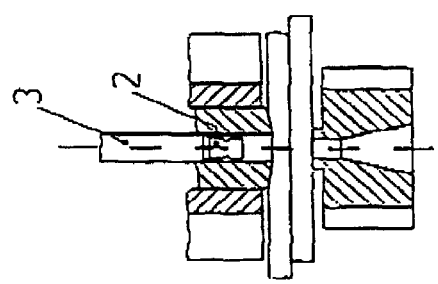
Figure 1A:
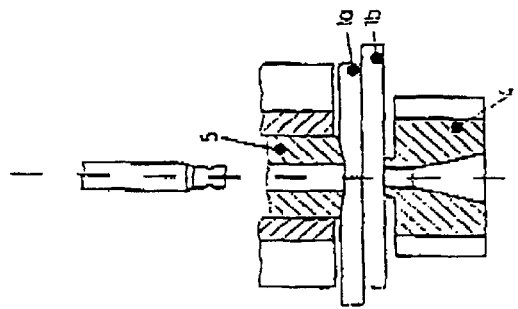

In FIGS. 1a to 1e the different phases of a mechanical joining process are shown taking the self-piercing riveting with solid rivet as an example. The representation includes the device of the invention. The parts to be joined 1a and 1b are positioned on the die 4. In FIG. 1a, the blank holder 5 is seated. The blank holder 5 is electrically decoupled from the die 4. Both parts form the poles of an electrical resistance heating. With the blank holder's 5 seating on the punch-side sheet 1a and possibly impressing the sheet 1a by the inclined face of the blank holder 5, heating by electric pulses starts. The inclined surface of the blank holder 5 makes possible to reduce the transition resistance between the blank holder 5 and the punch-side sheet 1a such that the current flow and hence the heating required occur in the future forming zone, i.e. in the range of the outer diameter of the solid rivet 2.

FIG. 1b shows the heating phase. During feed motion of punch 3 and solid rivet 2 the local heating is realised.

With the solid rivet's 2 reaching the sheet 1a according to FIG. 1c the heating is completed and the forming process starts. Timing elements or sensors control the electrical resistance heating.

According to FIG. 1d, the forming process is completed and the locally input amount of heat can quickly spread across the sheets 1a and 1b.

According to FIG. 1e, the blank holder 5, die 4 and cooling body 6 are in the upper dead point. Cooling of the tools is realised by the cooling body arrangement 6, 7, preferably made of copper.

In FIG. 2, a device of the invention is shown in which the path of the current lines 9 is represented. Said device localizes the heating between the tools, blank holder 5 and die 4, switched as poles, within a minimal area through the bearing surfaces 16, 17 as the path of the current lines 9 shows.

FIG. 3 shows an accompanying cooling body 6 arranged surrounding the blank holder 5. The cooling body 6 is provided with air cooling ribs 8 at the outer wall and can be water-cooled for high stroke numbers.

FIG. 4 shows another device of the invention, in which a ring of contact shoes 10, 11 surrounds the blank holder 5 and a ring of contact shoes 12, 13 surrounds the die 4. The bearing surfaces 18, 19 of the contact shoes 10, 11 are arranged very close to the blank holder 5 and die 4 thus restricting the range of heating in the sheets 1a, 1b.

FIG. 5, finally, shows a device of the invention, in which electrodes 14, 15 for heating the parts to be joined 1a, 1b are provided in a station preceding the forming station. The small bearing surfaces 20, 21 ensure the restricted heating range.

Nomenclature

1a—punch-side sheet
1b—die-side sheet
2—solid rivet
3—punch
4—die
5—blank holder
6—cooling body of the blank holder
7—cooling body of the die
8—air cooling ribs
9—current lines
10—upper contact shoe
11—upper contact shoe
12—lower contact shoe
13—lower contact shoe
14—upper electrode
15—lower electrode
16—bearing surface at the blank holder
17—bearing surface at the die
18—bearing surface at the contact shoe
19—bearing surface at the contact shoe
20—bearing surface at an electrode
21—bearing surface at an electrode
α—angle of the bearing surface of the blank holder

What is claimed is:

1. Method for the joining of overlapped parts to be joined of materials with extremely high deformation strength at room temperature using a joining tool consisting of punch, blank holder and die by joining through self-piercing riveting with semi-hollow rivet or solid rivet, or clinch joining respectively, characterized in that a local and time limited heating of the parts to be joined (1a, 1b) takes place in the future forming zone, whereby the heating is performed via the blank holder (5) and the die (4) or elements arranged directly adjacent to said blank holder and die (10/11, 12/13) or directly preceding them (14, 15) and the heating is initiated at the beginning of the joining process or immediately before it and is completed before the beginning of the forming.

2. Method according to claim 1 characterized in that the heating takes place between a blank holder (5) and a die (4) by electrical resistance heating, whereby the heating is initiated at the beginning of the working stroke.

3. Method according to claim 1 characterized in that the heating is by electrical resistance heating and occurs between an upper ring consisting of one or several contact shoes (10/11) and a lower ring consisting of one or several contact shoes (12/13), which are arranged surrounding the blank holder (5) and the die (4) each, whereby the heating is initiated at the beginning of the working stroke.

4. Method according to claim 1 characterized in that the heating is by electrical resistance heating and occurs between an electrode (14) and an electrode (15), which are assigned to a first station and the forming is subsequently carried out in a second station, whereby the heating is initiated immediately before the beginning of the forming.

5. Method according to claims 1, 2 or 3 characterized in that the forming zone is heated to a temperature of 35° C. to 70° C.

6. Method according to claim 5 characterized in that the forming zone is heated to a temperature of approx. 40° C.

7. Device for the realization of the method of claim 1, 2 or 3 characterized in that the blank holder (5) and the die (4) or elements arranged directly adjacent to said blank holder and die (14, 15) or directly preceding them (10/11, 12/13) are designed as poles for electrical resistance heating, whereby the blank holder (5), die (4), contact shoes (10/11, 12/13, 14/15) are provided with appropriate bearing surfaces (16, 17, 18, 19) so that current lines (9) extend through the parts to be joined (1a, 1b) in a locally restricted extent which limit the range of heating.

8. Device according to claim 7 characterized in that the blank holder (5) and the die (4) of a device for mechanical joining are designed as poles for electrical resistance heating, whereby the bearing surface (16) at the blank holder (5) and the bearing surface (17) at the die (4) is provided with a ring-shaped elevation such that current lines (9) extend through the parts to be joined (1a, 1b) in a locally restricted extent, which limit the range of heating.

9. Device according to claim 7 characterized in that an upper ring of one or several contact shoes (10/11) arranged surrounding a blank holder (5) and a lower ring of one or several contact shoes (12/13) surrounding a die (4) are provided, whereby the bearing surfaces of the contact shoes (10/11, 12/13) are designed such that current lines (9) extend through the parts to be joined (1a, 1b) in a locally restricted extent, which limit the range of heating.

10. Device according to claim 7 characterized in that an electrode (14) and an electrode (15) in a first station are provided for the heating of the parts to be joined (1a, 1b), whereby the bearing surfaces of the electrodes (14, 15) are designed such that current lines (9) extend through the parts to be joined (1a, 1b) in a locally restricted extent, which limit the range of heating, and a device for carrying out the forming in form of a second station is arranged succeeding the first station.

11. Device according to claim 8 characterized in that the bearing surface (16) at the blank holder (5) is provided with an inclined surface.

12. Device according to claim 7 characterized in that a cooling body (6) is provided surrounding the blank holder (5) and die (4), the rings of contact shoes (10/11, 12/13) or the electrodes (14, 15) each.

13. Device according to claim 12 characterized in that the cooling body (6) is provided with air cooling ribs (8).

14. Device according to claim 7 characterized in that the electrical resistance heating takes place in pulsed manner.

15. Device according to any of the claim 7 characterized in that the duration of the heating is limited to several milliseconds.

16. Device according to claim 11 characterized in that the inclined bearing surfaces (16) at the blank holder (5) have an angle $\alpha$ of 1° to 10°.

* * * * *